UNITED STATES PATENT OFFICE 2,025,116

ARYLAMIDE AND METHOD FOR ITS PRODUCTION

Herbert A. Lubs, Emmet F. Hitch, and Miles A. Dahlen, Wilmington, Del., assignors to E. I. du Pont de Nemours & Company, Wilmington, Del., a corporation of Delaware No Drawing. Application August 22, 1933, Serial No. 686,238

15 Claims. (Cl. 260—124)

This invention relates to the manufacture of new arylamides and more particularly refers to processes for the preparation of arylamides having in the preferred embodiment the following general formula:

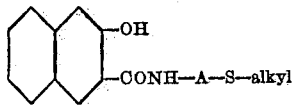

in which A represents an arylene nucleus.

It is an object of this invention to prepare arylamides of hydroxy-aryl-carboxylic acids, particularly 2-3-hydroxy-naphthoic acid. A further object is to prepare new intermediates which are particularly adapted for the manufacture of ice colors and insoluble azo pigments. A still further object is to prepare new intermediates suitable for use as coupling components. Additional objects will become apparent from a consideration of the following description.

These objects are attained according to the herein described invention which in its preferred embodiment comprises suspending 2-3-hydroxy-naphthoic acid in an inert solvent in the presence of an alkyl-mercapto-arylamine. The resulting suspension or solution is then treated with a dehydrating agent, and subsequently with an acid binding agent.

The invention may be more readily understood by a consideration of the following illustrative examples, in which the quantities are stated in parts by weight:

Example 1

141 parts of p-methylmercapto-aniline (parathioanisidine), 188 parts of 2-3-hydroxy-naphthoic acid and 1500 parts of dry toluene were agitated and warmed to about 50° C. At this point 46 parts of phosphorus trichloride were added slowly. The charge was then warmed gradually to the reflux point, where it was held for about 16 hours. The solution was cooled to about 80° C., and a dilute solution of soda ash was added slowly, taking care that the evolution of carbon dioxide did not cause the charge to foam over. The toluene was removed by steam distillation, and the solid that remained was filtered, washed well with water and dried. The new arylamide thus produced has the probable formula:

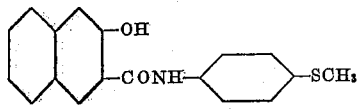

It had a melting range of 237–238° C.

Example 2

14 parts of o-methylmercapto-aniline (o-thioanisidine) and 21 parts of 2-3-hydroxy-naphthoic acid, were added to 800 parts of toluene, and the mixture heated to the boiling point to remove the moisture present. The charge was then cooled to about 60° C., 7 parts of phosphorus trichloride added slowly at 60–65° C., and the mixture refluxed for about 18 hours. The toluene suspension-solution was then cooled to about 80° C. and a dilute solution of sodium bicarbonate added, care being taken that the evolution of carbon dioxide did not cause excessive foaming. The toluene was removed by steam distillation, the charge was filtered and the solid washed with water until free of alkali.

The 2-3-hydroxy-naphthoyl derivative of o-thioanisidine was purified by dissolving in caustic soda solution, clarifying with charcoal, and reprecipitating with dilute hydrochloric acid. The precipitate was filtered, washed and dried. 23 parts of the final product was obtained. It showed a melting range of 134–135.5° C., and had the probable formula:

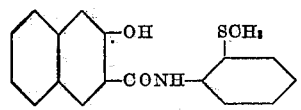

Example 3

If in Example 2, the 14 parts of o-methylmercapto-aniline, were replaced by 18 parts of 4-ethoxy-2-methylmercapto-aniline, and the process repeated, the 2-3-hydroxy-naphthoyl derivative of 4-ethoxy-2-methylmercapto-aniline was obtained. It had a melting range of 117–118° C., and the probable formula:

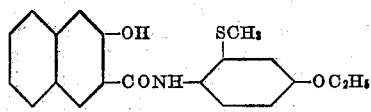

Example 4

21 parts of 2-3-hydroxy-naphthoic acid and 18 parts of 2-methylmercapto-4-chloro-6-methyl-aniline were added to 880 parts of toluene, and the mixture distilled to remove traces of moisture. Upon cooling the charge to about 50° C., 7 parts of phosphorus trichloride diluted with about 75 parts of toluene were added slowly at 50–55° C. The mixture was then refluxed for about 18 hours, and cooled to about 80° C. A dilute solution of sodium bicarbonate was then added and the toluene removed by steam distillation. The charge was cooled, filtered, the solid washed well with water, and dried. It had a melting range of 199.5–200.5° C., and the probable formula:

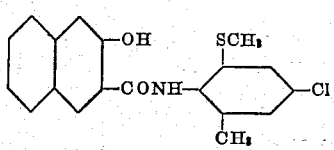

It is to be understood that the aforementioned examples are representative only of the methods of practicing the present invention. These methods may be subjected to wide variation and modification. For instance when 2-3-hydroxy-naphthoic acid is suspended in an inert solvent in the presence of an alkyl mercapto-arylamine, numerous inert solvents may be used for this purpose. Among such solvents mention may be made of toluene, chlorobenzene, nitrobenzene, xylene and tetrachlorethane. The resulting suspension or solution is treated with a dehydrating agent, such as phosphorus trichloride or thionyl chloride. Upon completion of the dehydration an acid binding agent is advisably added to the solution or suspension. Examples of such agents are sodium bicarbonate, potassium carbonate, sodium acetate, etc. After neutralization with the acid binding agent the solvent may be removed by steam distillation, leaving the desired arylamide suspended in aqueous residue. This residue may then be separated by filtration, washed, dried, and if desired purified by crystallization from a solvent. In place of the aforementioned steam distillation the neutralized reaction mass may frequently be cooled, causing the arylamide to separate as a crystalline solid, which is then separated and treated as previously.

The arylamides comprised herein may likewise be prepared by reacting 2-3-hydroxy-naphthoyl-chloride with an alkyl mercapto-arylamine, preferably in an inert solvent at elevated temperatures. This reaction may also be effected by suspending the alkyl mercapto-arylamine in water in the presence of an acid binding agent, and treating with the 2-3-hydroxy-naphthoyl-chloride, the acid halide being added as a solid or in solution in an inert solvent. The resulting product may be separated and purified according to the instructions given pertaining to 2-3-hydroxy-naphthoic acid.

It is apparent from a consideration of the present description that numerous alkyl mercapto-arylamines may be selected in preparing the arylamides forming the subject matter of the instant invention. These arylamines are preferably selected from amines of the benzene and naphthalene series. Since one of the chief uses of the products is the preparation of ice colors it is advisable for this purpose to select arylamines which are free from water solubilizing groups, such as the carboxylic and sulfonic acid groups. However with the exception of the aforementioned water-solubilizing groups these arylamines may have one or more of the well known and commonly occurring groups substituted thereon, for example, alkyl, alkoxy, nitro, halogen, and additional alkyl-mercapto groups. Among the arylamines which may be used with excellent results mention may be made of the following:

Ortho-thiophenetidine
Meta-thiophenetidine
Para-thiophenetidine
2,4-Di-(methylmercapto)-aniline
2-Methyl-4-butylmercapto-aniline
4-Nitro-2-methylmercapto-aniline
2-Methoxy-5-methylmercapto-aniline
4-Methylmercapto-alpha-naphthylamine
6-Ethylmercapto-beta-naphthylamine
4-Chloro-2-methylmercapto-aniline While arylamides of 2-3-hydroxy-naphthoic acid are preferred, it is to be understood that this invention also includes within its scope derivatives of other hydroxy-aryl-carboxylic acids, for example:

1-Naphthol-4-carboxylic acid
2-Naphthol-6-carboxylic acid
6- or 7-Amino-, alkylamino-, arylamino-, or acylamino-2-naphthol-3-carboxylic acids
Ring alkylated (and alkoxylated)-2-naphthol-3-carboxylic acid
Hydroxy-anthracene-carboxylic acids
Hydroxy-carbazole-carboxylic acids
Hydroxy-naphthocarbazole-carboxylic acids
Hydroxy-phenanthrene-carboxylic acids
Hydroxy-indole-carboxylic acids
Salicylic acid and its alkyl-, alkoxy- and halogeno derivatives
Hydroxy-diarylamine-carboxylic acids, etc.

The products heretofore described are exceedingly useful in the prepartion of ice colors. They may be coupled with the usual diazo salts, and their method of application to textile materials may be varied according to customary processes. In addition to imparting attractive colors of good fastness to the fibers they are also well adapted to the prepartion of insoluble pigments. Azo dyes which are produced by coupling diazotized arylamines or tetrazotized arylene diamines with the arylamines forming the subject matter of the present invention are described and claimed in a copending application Serial No. 686,568, filed August 24, 1933.

As many apparently widely different embodiments of this invention may be made without departing from the spirit and scope thereof, it is to be understood that the invention is not limited to the specific embodiments thereof except as defined in the appended claims.

We claim:

1. A process for producing organic compounds which comprises reacting an alkylmercapto-arylamine with a member selected from the group consisting of hydroxy-aryl-carbonyl-chlorides and hydroxy-aryl-carboxylic acids, the reactants when the latter is used being treated with a dehydrating agent.

2. A process for producing water-insoluble organic compounds which comprises reacting an alkylmercapto-arylamine having the following general formula:

in which A represents an arylene nucleus of the benzene or naphthalene series which may have substituted thereon non-water-solubilizing groups, and R represents an alkyl group, with a member selected from the group consisting of hydroxy-aryl-hydrochloric acid and hydroxy-aryl-carboxylic acid, the reactants when the latter is used being treated with a dehydrating agent.

3. A process for producing water-insoluble organic compounds which comprises reacting an alkylmercapto-arylamine having the following general formula:

in which A represents an arylene nucleus of the benzene series which is free from carboxylic and sulfonic acid groups, and R represents an alkyl group, with 2-3-hydroxy-naphthoic acid in the presence of a dehydrating agent.

4. A process for producing water-insoluble organic compounds which comprises reacting an alkylmercapto-arylamine having the following general formula:

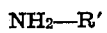

wherein R' represents an akylmercapto-benzene, an alkylmercapto-alkyl-benzene, an alkylmercapto-alkoxy-benzene or an alkylmercapto-halogeno-benzene radical, with 2-3-hydroxy-naphthoic acid in the presence of a dehydrating agent.

5. A process for producing water-insoluble organic compounds which comprises reacting an alkylmercapto-arylamine having the following general formula:

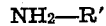

wherein R' represents a methylmercapto-benzene radical, with 2-3-hydroxy-naphthoic acid in the presence of phosphorus trichloride.

6. A process for producing water-insoluble organic compounds which comprises reacting an alkylmercapto-arylamine having the following general formula:

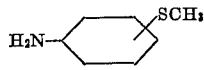

with 2-3-hydroxy-naphthoic acid in the presence of phosphorus trichloride.

7. Organic compounds having the following general formula:

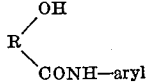

in which R represents an aryl radical and aryl represents an aryl radical having substituted thereon at least one alkylmercapto group.

8. Water-insoluble organic compounds having the following general formula:

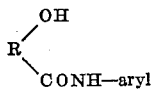

in which R represents an aryl radical and aryl represents the radical of an alkylmercapto-arylamine which may have substituted thereon non-water-solubilizing groups.

9. Water-insoluble organic compounds having the following general formula:

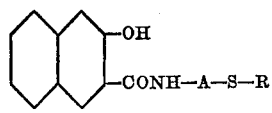

in which A represents an arylene nucleus of the benzene or naphthalene series which may have substituted thereon non-water-solubilizing groups, and R represents an alkyl group.

10. Water-insoluble organic compounds having the following general formula:

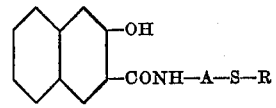

in which A represents an arylene nucleus of the benzene series which is free from carboxylic and sulfonic acid groups, and R represents an alkyl group.

11. Water-insoluble organic compounds having the following general formula:

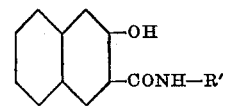

wherein R' represents an alkylmercapto-benzene, an alkylmercapto-alkyl-benzene, an alkylmercapto-alkoxy-benzene or an alkylmercapto-halogeno-benzene radical.

12. Water-insoluble organic compounds having the following general formula:

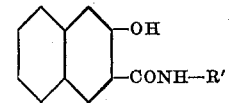

wherein R' represents a methylmercapto benzene radical.

13. Water-insoluble organic compounds having the following general formula:

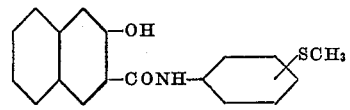

14. A water-insoluble organic compound having the following formula:

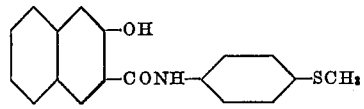

15. A process for producing a water-insoluble organic compound which comprises heating a toluene solution of para-methylmercapto-aniline and 2-3-hydroxy-naphthoic acid in the presence of phosphorus trichloride.

HERBERT A. LUBS.
EMMET F. HITCH.
MILES A. DAHLEN.